United States Patent [19]

Church

[11] Patent Number: 4,696,498

[45] Date of Patent: Sep. 29, 1987

[54] TUBULAR CONNECTION

[75] Inventor: Kristy L. Church, Houston, Tex.

[73] Assignee: Quanex Corporation, Houston, Tex.

[21] Appl. No.: 924,652

[22] Filed: Oct. 29, 1986

[51] Int. Cl.$^4$ ............................................ F16L 25/00
[52] U.S. Cl. ..................................... 285/334; 285/351; 285/383
[58] Field of Search ................ 285/333, 334, 355, 24, 285/351, 383

[56] References Cited

U.S. PATENT DOCUMENTS

| | | |
|---|---|---|
| 1,932,427 | 10/1933 | Stone . |
| 2,772,102 | 11/1956 | Webb . |
| 2,980,451 | 4/1961 | Taylor et al. . |
| 3,224,799 | 12/1965 | Blose et al. . |
| 3,489,437 | 1/1970 | Duret . |
| 3,508,771 | 4/1970 | Duret ................................ 285/334 |
| 3,989,284 | 11/1976 | Blose . |
| 4,009,893 | 3/1977 | Schatton . |
| 4,085,951 | 4/1978 | Morris ............................ 285/355 X |
| 4,161,332 | 7/1974 | Blose . |
| 4,192,533 | 3/1980 | Blose ............................... 285/355 X |
| 4,244,607 | 1/1981 | Blose . |
| 4,253,687 | 3/1981 | Maples ........................... 285/355 X |
| 4,373,754 | 2/1983 | Bollfrass et al. ................ 285/355 X |
| 4,429,904 | 2/1984 | Reimert ............................... 285/24 |

FOREIGN PATENT DOCUMENTS 446021 1/1948 Canada .............................. 285/355

Primary Examiner—Dave W. Arola
Attorney, Agent, or Firm—Vinson & Elkins

[57] ABSTRACT

A connection for well tubular goods including a male member, a female member, each having a double set of steep tapered hook threads, two internal pressure seals including a compressible primary metal-to-metal seal and a supplementary seal made up of a resilient corrosion resistant material and additionally, a primary resilient corrosion resistant external pressure seal, and a reverse shoulder engagement between the end of the male member and a shoulder on the female member to hold the primary metal sealing surfaces in sealing engagement.

9 Claims, 5 Drawing Figures

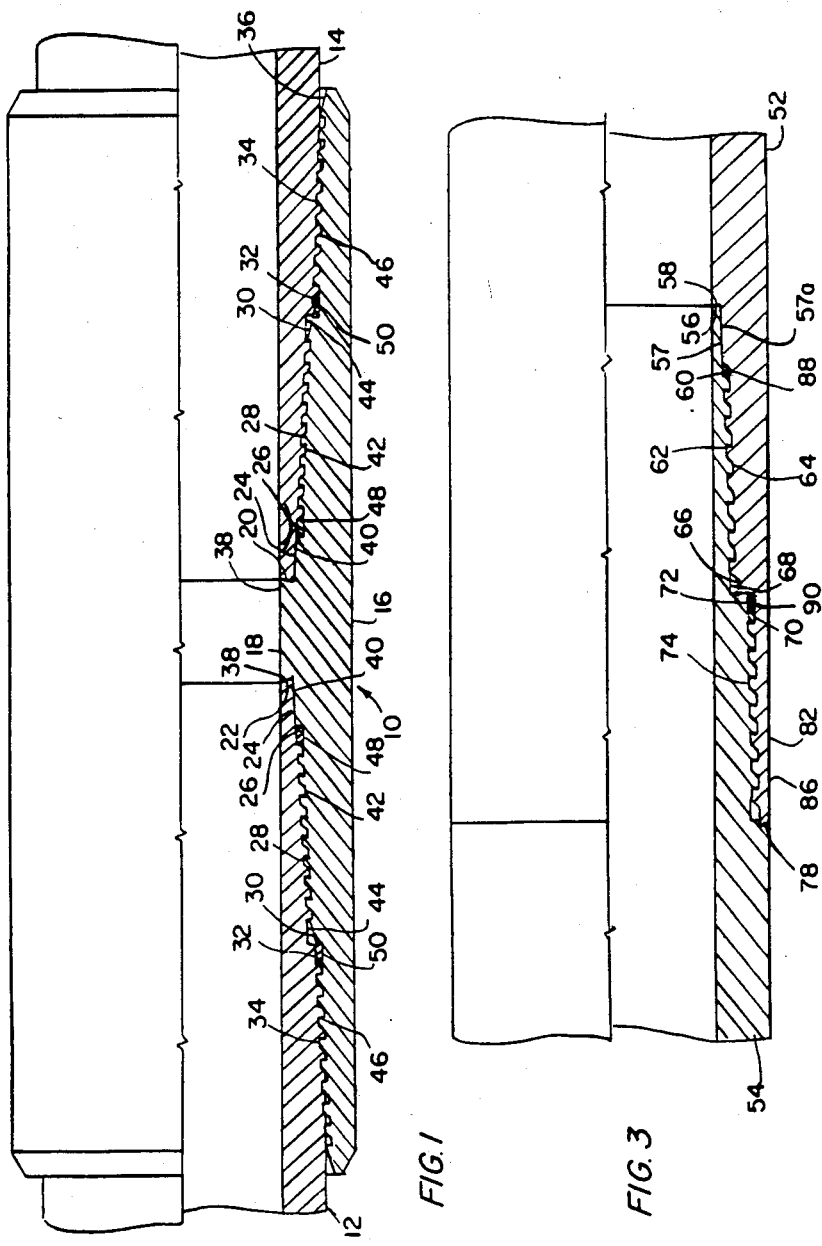

4,696,498

TUBULAR CONNECTION

This is a continuation of application Ser. No. 699,848, filed Mar. 21, 1985; which is a continuation of application Ser. No. 441,870, filed Nov. 11, 1982, and both now abandoned.

BACKGROUND

Casing and tubing for wells are made up in sections and lowered into the well bore. The sections have been joined by threaded connections with the sections having box and pin ends for direct assembly or with the sections having pin ends joined by an internally threaded coupling. As wells get deeper and encounter corrosive conditions, such as sour gas and salt water, there is a need for higher connection efficiencies in tensile and compressive strength as well as greater resistance to internal and external well bore pressures without substantial increases in the connection diameter.

An early effort to increase the strength of well tubular connections is shown in U.S. Pat. No. 2,772,102 which suggests threads having a normal load bearing face and a tapered flank with the root and crests being in sealing contact at the inner end of the threads in the coupling. U.S. Pat. No. 2,980,451 suggests the use of a seal ring in a groove in the female threads to accomplish the seal. U.S. Pat. No. 3,224,799 discloses a tubular connection in which the load bearing face has a slight negative angle and the other face has an angle in the range from 30° to 60°. U.S. Pat. No. 3,489,437 includes a reverse shoulder at the inner end of the female threads for engaging a similar taper on the pin end so that the pin is urged outward to assure continued engagement of the threads near the end of the pin. U.S. Pat. No. 3,508,771 includes a shoulder on the female member against which the male member engages to protect the threads from damage when the connection is torqued.

An undercut type of threading is shown in U.S. Pat. No. 3,989,284. Two sets of slightly tapered threads in a tubular connection with a seal between the two sets of threads and a reverse shoulder on the female member engaged by the end of the male member are shown in U.S. Pat. No. 4,009,893. A similar connection with a double set of cylindrical threads is shown in U.S. Pat. Nos. 4,161,332, 4,192,533 and 4,244,607.

SUMMARY

The present invention is an improved well tubular connection which has a two step, steep tapered threaded connection with hook threads, resilient seal rings, a compressible primary metal-to-metal seal and a reverse shoulder in both a pin and box connection and a coupling connection.

An object of the present invention is to provide an improved threaded connection for well tubular goods which has the yield strength of the tubular member.

A further object is to provide an improved threaded connection for well tubular goods which does not cross thread or gall during assembly or disassembly.

Another object is to provide an improved threaded connection for well tubular goods having separate seals against both internal and external pressures.

Still another object is to provide an improved threaded connection for well tubular goods having both a resilient seal and a metal-to-metal seal.

A still further object is to provide an improved threaded connection for well tubular goods which resists jump-out of the threads under high tensile loads.

BRIEF DESCRIPTION OF THE DRAWINGS

These and other objects and advantages of the present invention are hereinafter set forth and explained with reference to the drawings wherein:

FIG. 1 is a half-sectional view of the improved coupling connection of the present invention.

FIG. 3 is a half-sectional view of the improved pin and box connection of the present invention.

DESCRIPTION OF THE PREFERRED EMBODIMENTS

Figure 2A:
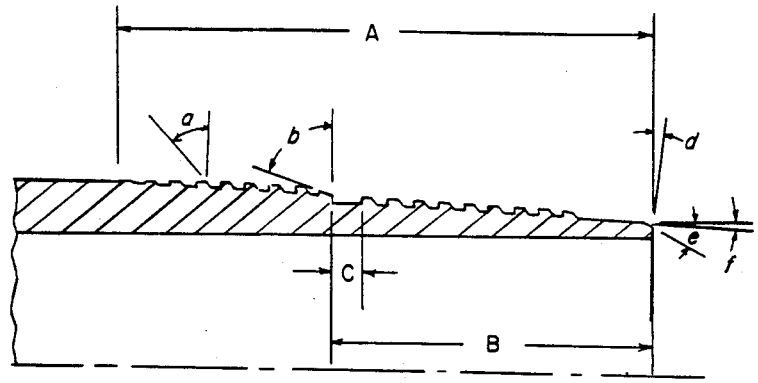
FIG. 2A is a partial detail sectional view of the male threads.

As shown in FIG. 1, joint 10 includes plain end male members 12 and 14 of a uniform inner diameter joined by coupling 16. Coupling 16 includes central portion 18 having the same inner diameter of bore as the bores formed by the inside diameters through male members 12 and 14 and terminates in reverse or undercut shoulders 20 and 22. Since the interior on each side of coupling 16 is the same but reversed, one side is described hereafter. Tapered surface 24 defines a smooth inner peripheral surface which extends from shoulder 20, tapering slightly outwardly, and terminates in seal groove 26. First tapered hook threads 28 extend from seal groove 26 to tapered surface 30 which leads into seal groove 32. Second tapered hook threads 34 extend from seal groove 32 to the outer end of coupling 16 and terminate in tapered surface 36.

The threaded portions of male members 12 and 14 are the same so only member 14 is hereafter described. The end of member 14 includes tapered shoulder 38 which mates with reverse shoulder 20. Surface 40 defines a smooth outer peripheral surface which tapers outwardly from end shoulder 38 to first tapered hook threads 42 which end in recess 44. Second tapered hook threads 46 extend to the exterior of member 14.

When assembled as shown in FIG. 1 members 12 and 14 are threaded until shoulders 38 abut reverse shoulders 20 and 22. Seal rings 48 are positioned in seal grooves 26 and radially compressed seal rings 50 are positioned between the sets of threads. Also, a metal-to-metal seal is provided by the engagement of surfaces 24 and 40 which form smooth seal contact areas with the reverse shoulders 20 and 22 assuring that surfaces 24 and 40 are maintained in sealing engagement. The metal-to-metal seal of surfaces 24 and 40 and seal ring 48 provide independent primary internal pressure seals and seal rings 50 provides the primary external pressure seal for each pin end.

As shown in FIG. 3, the pin and box connection form of the present invention includes box 52 and pin 54 having plain ends to provide a connection having uniform inner and outer diameters. Box 52 includes internal reverse shoulder 56 which engages tapered surface 58 on pin 54 and tapered surface 57 on box 52 engages tapered surface 57a on pin 54. Seal groove 60 leads into first tapered hook threads 62 which mate with threads 64 on pin 54 and end in surface 66 facing recess 68 on pin 54. Surface 66 ends in reverse shoulder 70 and seal groove 72 leads into second tapered hook threads 74 which end in reverse shoulder 78. Threads 82 engage threads 74 with reverse shoulder 86 engaging reverse shoulder 78 to prevent its outward movement.

Seal ring 88 is positioned in seal groove 60 and seal ring 90 is positioned in seal groove 72. Such seals together with the metal-to-metal seal of surfaces 57 and 57a provide improved sealing of the connection.

Figure 2C:
FIG. 2C illustrates an enlarged sectional view of a single thread of the present invention.
Figure 2B:
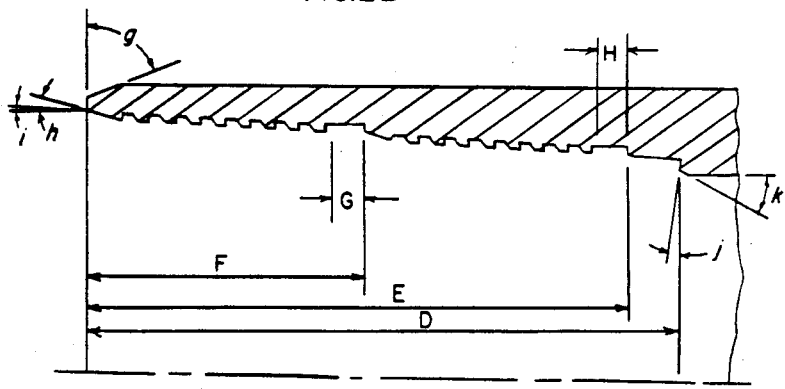
FIG. 2B shows a partial detail sectional view of the female threads of the improved integral connection of the present invention.

FIGS. 2A, 2B and 2C are a typical example of male member 100 and coupling 102 of the present invention for a 9⅝ inch diameter, 0.750″ wall casing. The following table is a listing of the preferred dimensions and angles as shown in the drawings for a single particular size and application and will change for other sizes and applications.

| Dimensions | Angles |
|---|---|
| A 8.665 | a 30° |
| B 4.6625 | b 75° |
| C 0.375 | c 12° |
| D 8.610 | d 15° |
| E 7.865 | e 20° |
| F 4.0025 | f 4° |
| G 0.375 | g 70° |
| H 0.375 | h 15° |
|  | i 4° |
|  | j 15° |
|  | k 15° |
|  | l 4° |

As can be seen the load bearing side of the tapered hook threads has an undercut in the range from 3° to 13° and preferably of 12° for the example size. This reverse angle functions to prevent jump-out of the threads. Also, the steep thread tapers which are preferred to approximately 1.5 inches per foot as compared to tapers of the prior art which have been 0.75 inch per foot up to 1.125 inches per foot provide a greater contact area per thread during stabbing which decreases the opportunity of cross threading or thread damage during assembly. The dual step thread design provides greater stabbing clearance. The steeper tapers provide increased stabbing depth to protect against pin nose damage and better stability during assembly. The steep taper of threads reduces the number of turns required from stabbing to power tight to reduce assembly time. The hand tight plane to the power tight plane is less than one turn. This reduces the starter load scraping distance in making and breaking the connection to reduce the chance of galling of the threads when made of materials such as stainless steel or high chrome steels.

The dual step steep taper threads allow assembly at a greater misaligned angle without damage to the connection. The coarse pitch and depth of stab function to prevent cross threading when the connection is assembled with imperfect alignment. With the steep taper dual step threads of the present invention the thread contact during stabbing is increased, thus decreasing the opportunity of thread rolling and shearing.

A two step threaded connection as herein disclosed has been tested by the University of Illinois and was found to have 100% efficiency, i.e., the connection yield strength was equal to the yield strength of the tubular member.

During such testing, three 9⅝ inch by ¾ inch wall oil well casings with couplings were tested in tension. The first specimen was tested to destruction and failed under load at 2.84 million pounds. The mode of failure occurred by fracture of the pin in the coupling. Elongation of the first specimen was approximately ten percent. Because of equipment problems, specimen number 2 was tested to two million pounds with an elongation of 1½ percent and specimen number 3 was tested to two million pounds with an elongation of approximately one percent. Neither specimen 2 nor 3 experienced failure at the two milliion pound level.

It should be noted that the improved connection of the present invention provides two internal pressure seals including a compressible primary metal-to-metal seal and a supplementary seal made up of resilient corrosion resistant material and additionally, a primary resilient corrosion resistant external pressure seal. This connection is applicable to the threaded and coupled connection shown, and the pin and box connections shown and to an externally upset end connection.

What I claim is:

1. A high tensile strength two step threaded connection for adjacent mating end portions of a pair of plain end, non-upset axially aligned tubular members, said two step connection comprising:

a male tubular member having a tapered threaded end portion and being of uniform inner and outer diameters throughout its length except for said threaded end portion, said end portion defining an annular end shoulder and an outer peripheral surface tapering outwardly from said end shoulder in a generally transverse relation to the end shoulder, said outer peripheral surface being generally smooth directly adjacent said end shoulder to provide a metal-to-metal seal contact area;

a female tubular member having a mating tapered threaded end portion and an inner diameter forming a smooth continuation of the inner diameter of said male tubular member to provide a straight interior bore of a uniform inner diameter, said female tubular member having an annular inner shoulder about its inner periphery and an inner peripheral surface tapering outwardly from said inner shoulder in generally complementary relation to said outer peripheral surface of said male tubular member, said inner peripheral surface being generally smooth directly adjacent said inner shoulder to form a seal contact area for engaging said seal contact area on said male tubular member in a compressible metal-to-metal sealing relation;

the threaded end portion of each of said tubular members having a pair of stepped sets of mating tapered hook threads adjacent the smooth seal contact area thereof with each set of hook threads having a steep taper and a coarse pitch thereby to provide an increased stabbing depth and to prevent cross threading when the connection is assembled with imperfect axial alignment;

said steep taper and coarse pitch being constructed and arranged so that said tubular members are rotated less than around one turn from an initial hand tight plane to a power tight plane at final assembly thereby to minimize galling and scraping action between the tubular members and to facilitate making and breaking the connection;

said smooth metal-to-metal contact areas upon rotation of said tubular members from a hand tight plane to a power tight plane after said contact areas initially engage each other resulting in compressible metal-to-metal sealing contact thereby to provide a metal-to-metal seal against internal fluid pressure which maintains its sealing pressure upon an increase in internal fluid pressure, said tubular members being constucted and arranged so that said connection after final assembly to said power tight plane will have a tensile yield strength at least equal to the tensile yield strength of the tubular members thereby providing a high strength connection for plain end tubular members.

2. The high tensile strength two step connection as set forth in claim 1 wherein said male tubular member is a pin end and said female member is a box end, said connection having a uniform cross-sectional area defining uniform inner and outer diameters and forming a smooth uninterrupted continuation of the inner and outer peripheries of the tubular members.

3. The high tensile strength two step connection as set forth in claim 1 wherein said female member is a coupling and receives in threaded relation a second male member substantially identical to said first mentioned male member.

4. The high tensile strength two step connection as set forth in claim 1 wherein the tapered hook threads have an undercut in the range from 3° to 13° thereby to prevent possible jump-out of the threads.

5. The high tensile strength two step connection as set forth in claim 1 wherein an annular groove is positioned between the smooth sel contact areas of said tubular members generally adjacent the inner end of the hook threads thereon;

and a resilient seal ring is positioned in said groove to seal between the tubular members for providing a resilient seal against internal fluid pressure.

6. The high tensile strength two step connection as set forth in claim 1 wherein an annular groove is provided on one of said tubular members at the juncture of the pair of stepped sets of tapered hook threads thereon; and a resilient seal is positioned in said groove to seal between the tubular members and provide an external pressure seal.

7. A high tensile strength threaded two step connection for adjacent threaded end portions of a pair of plain end, non-upset axially aligned tubular members and having a straight interior bore of a uniform inner diameter, said two step connection comprising:

a male tubular member having a tapered end portion and being of uniform inner and outer diameters throughout its length except for said end portion, said end portion defining an annular end shoulder and an outer peripheral surface tapering outwardly from said end shoulder in a generally transverse relation to the end shoulder, said outer peripheral surface being generally smooth directly adjacent said end shoulder to provide a metal-to-metal seal contact area;

a mating female tubular member forming a smooth continuation of the inner diameter of said male tubular member to provide said straight bore, said female tubular member having an annular inner shoulder about its inner periphery and an inner peripheral surface tapering outwardly from said inner shoulder in generally complementary relation to said outer peripheral surface of said male tubular member, said inner peripheral surface being generally smooth directly adjacent said inner shoulder to form a seal contact area for engaging said seal contact area on said male tubular member in a compressible metal-to-metal sealing relation;

the threaded end portion of said tubular members having a pair of stepped sets of mating tapered hook threads adjacent the smooth seal contact area thereof with each set of hook threads having a steep taper and a coarse pitch thereby to provide an increased stabbing depth and to prevent cross threading when the connection is assembled with imperfect axial alignment, said tapered hook threads having an undercut in the range from 3° to around 13° thereby to prevent possible jump-out of the threads;

said steep taper and coarse pitch being of such a nature that said tubular members are rotated less than around one turn from an initial hand tight plane to a power tight plane at final assembly thereby to minimize galling and scraping action between the tubular members and to facilitate making and breaking the connection;

said smooth metal-to-metal contact areas upon rotation of said tubular members from a hand tight plane to a power tight plane after said contact areas initially engage each other resulting in deformable metal-to-metal sealing contact thereby to provide a metal-to-metal seal against internal fluid pressure which maintains its sealing pressure upon an increase in internal fluid pressure, said tubular members being constucted and arranged so that said connection after final assembly to said power tight plane will have a tensile yield strength at least equal to the tensile yield strength of the tubular members thereby providing a high tensile strength connection for plain end tubular members.

8. The high tensile strength two step connection as set forth in claim 7 wherein said male tubular member is a pin end and said female member is a box end, said connection having a uniform cross-sectional area defining uniform inner and outer diameters forming smooth uninterrupted continuations of the inner and outer peripheries of the tubular members.

9. A high tensile strength two step threaded connection for adjacent threaded end portions of a pair of plain end, non-upset axially aligned tubular members and having a straight interior bore of a uniform inner diameter, said two step connection comprising:

a male tubular member having a tapered end portion and being of uniform inner and outer diameters throughout its length except for said end portion, said end portion defining an annular end shoulder and an outer peripheral surface tapering outwardly from said end shoulder in a generally transverse relation to the end shoulder, said outer peripheral surface being generally smooth directly adjacent said end shoulder to provide a metal-to-metal seal contact area;

a mating female tubular member forming a smooth continuation of the inner diameter of said male tubular member to provide said straight bore, said female tubular member having an annular inner shoulder about its inner periphery and an inner peripheral surface tapering outwardly from said inner shoulder in generally complementary relation to said outer peripheral surface of said male tubular member, said inner peripheral surface being generally smooth directly adjacent said inner shoulder to form a seal contact area for engaging said seal contact area on said male tubular member in a compressible metal-to-metal sealing relation;

the threaded end portion of each of said tubular members having a pair of stepped sets of mating tapered hook threads adjacent the smooth seal contact area thereof with each set of hook threads having a steep taper and a coarse pitch thereby to provide an increased stabbing depth and to prevent cross threading when the connection is assembled with imperfect axial alignment, said tapered hook threads having an undercut in the range from 3° to around 13° thereby to prevent possible jump-out of the threads;

said steep taper and coarse pitch being of such a nature that said tubular members are rotated less than around one turn from an initial hand tight plane to a power tight plane at final assembly thereby to minimize galling and scraping action between the tubular members and to facilitate making and breaking the connection;

said smooth metal-to-metal contact areas upon rotation of said tubular members from a hand tight plane to a power tight plane after said contact areas initially engage each other resulting in compressible metal-to-metal sealing contact thereby to provide a metal-to-metal seal against internal fluid pressure which maintains its sealing pressure upon an increase in internal fluid pressure;

one of said tubular members having an annular groove positioned at the juncture of the pair of stepped sets of tapered hook threads thereon with said groove being defined between a pair of spaced radial surfaces, a resilient seal adapted to be positioned in said groove and compressed radially by said radial surfaces into a sealing relation between the tubular members upon rotation of said tubular members to the power tight plane thereby to provide an external pressure seal;

said tubular members being constucted and arranged so that said connection after final assembly to said power tight plane will have a tensile yield strength at least equal to the tensile yield strength of the tubular members thereby providing a high tensile strength connection for plain end tubular members.

* * * * *